Patented Jan. 30, 1951

2,539,668

UNITED STATES PATENT OFFICE 2,539,668

PRODUCTION OF A 1-FLUORO-3,3-DIMETHYLALKANE BY REACTING ETHYLENE, A TERTIARY ALKANOL AND HYDROGEN FLUORIDE

Carl B. Linn and Louis Schmerling, Riverside, Ill., assignors to Universal Oil Products Company, Chicago, Ill., a corporation of Delaware No Drawing. Application September 29, 1948, Serial No. 51,856

10 Claims. (Cl. 260—653)

This application is a continuation-in-part of our co-pending application Serial Number 673,608 filed May 31, 1946, now Patent No. 2,451,843, October 19, 1948.

This invention relates to a method for producing highly branched fluoroalkanes.

An object of this invention is to produce a fluorodialkylalkane.

Another object of this invention is to produce a fluorodimethylbutane.

Still another object of this invention is to produce a 1-fluoro-3,3-dialkylalkane.

A further object of this invention is to produce 1-fluoro-3,3-dimethylbutane.

A still further object of this invention is a method of producing 1-fluoro-3,3-dimethylpentane.

In one embodiment, the present invention relates to a process for producing a 1-fluoro-3,3-dialkylalkane which comprises reacting ethylene and a member of the group consisting of a tertiary-olefin, a tertiary-alkanol and a tertiary-alkyl fluoride in the presence of liquid hydrogen fluoride.

In another embodiment, the present invention relates to a process for producing 1-fluoro-3,3-dimethylbutane which comprises reacting ethylene and a member of the group consisting of isobutylene, tertiary-butyl alcohol, and tertiary-butyl fluoride in the presence of liquid hydrogen fluoride.

In a further embodiment, the present invention relates to a process for producing 1-fluoro-3,3-dimethylbutane which comprises reacting ethylene and tertiary-butyl-fluoride in the presence of liquid hydrogen fluoride at a temperature of from about —50° to about 100° C.

In a still further embodiment, this invention relates to a process which comprises reacting ethylene, a tertiary alkanol, and hydrogen fluoride at a temperature of from about —50° to about 100° C. to form a 1-fluoro-3,3-dialkylalkane having two carbon atoms more per molecule than the tertiary alkanol charged.

We have found that ethylene and isobutylene react under certain circumstances in the presence of hydrogen fluoride to yield a fluorohexane, 1-fluoro-3,3-dimethylbutane, which is an example of a new class of compounds, namely, the 1-fluoro-3,3-dialkylalkanes. Another example of these compounds is 1-fluoro-3,3-dimethylpentane which is produced by reacting ethylene and a tertiary-pentene with hydrogen fluoride. These substances being primary alkyl fluorides and having a neopentyl group attached to the carbon atom holding the fluorine atom are exceptionally stable. Unlike the alkyl fluorides formed by the addition of hydrogen fluoride to the double bond of propene and higher molecular weight olefins, these compounds are not affected by concentrated hydrogen fluoride, in which they are soluble. Being also miscible with hydrocarbons, these fluorides containing a neopentyl group have utility in processes requiring a common solvent for hydrogen fluoride and hydrocarbons.

The alkyl fluoride, 1-fluoro-3,3-dimethylbutane, is formed when ethylene, hydrogen fluoride and isobutylene or tertiary butyl alcohol are contacted at a temperature of from about —50° to about 100° C. but preferably at temperatures of from about —10° to about 50° C.

1-fluoro-3,3-dimethylbutane is thus prepared using either batch or continuous types of operation by contacting isobutylene with substantially anhydrous hydrogen fluoride under ethylene pressures and at temperatures of from about —50° to about 100° C., by contacting isobutylene with substantially anhydrous hydrogen fluoride at a temperature of from about —40° to about +20° C. and adding ethylene to the resultant reaction product at about —50° to about 100° C., by preparing tertiary butyl fluoride by the reaction of tertiary butyl alcohol or isobutylene with aqueous hydrogen fluoride and then reacting the resultant tertiary butyl fluoride with ethylene at a temperature generally below about 50° C., and preferably below 0° C. in the presence of substantially anhydrous hydrogen fluoride; and by reacting tertiary butyl alcohol, ethylene, and substantially anhydrous hydrogen fluoride at a temperature of from about —50° to about 100° C. and preferably at a temperature of from about —10° C. to about 50° C. This process is also useful for reacting tertiary alkanols with higher molecular weights than tertiary butyl alcohol with ethylene and hydrogen fluoride to produce 1-fluoro-3,3-dialkylalkanes. Thus tertiary amyl alcohols and hydrogen fluoride may be reacted to from 1-fluoro-3,3-dimethylpentane as illustrated by the following equation:

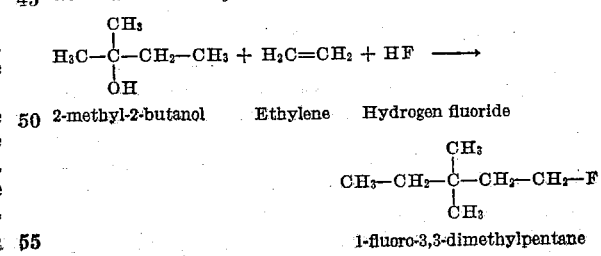

2-methyl-2-butanol  Ethylene  Hydrogen fluoride 1-fluoro-3,3-dimethylpentane

The corresponding reaction between tertiary butyl alcohol (also called 2-methyl-2-propanol), ethylene, and hydrogen fluoride is represented by the equation:

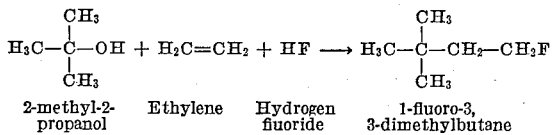

| 2-methyl-2-propanol | Ethylene | Hydrogen fluoride | 1-fluoro-3,3-dimethylbutane |

Also a tertiary alkanol containing three alkyl radicals represented as $R_1$, $R_2$ and $R_3$ undergoes a similar reaction as illustrated by the following equation to form a fluoro-3,3-dialkyl alkane.

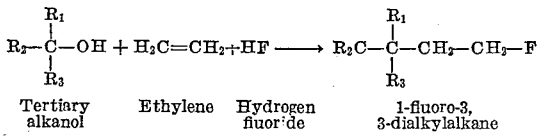

| Tertiary alkanol | Ethylene | Hydrogen fluoride | 1-fluoro-3,3-dialkylalkane |

The following examples are introduced to illustrate the process of this invention but they should not be misconstrued to limit unduly its generally broad scope.

*Example I*

A mixture of 41 grams of ethylene, 239 grams of isobutylene and 850 grams of isobutane was contacted with hydrogen fluoride of 98% concentration at 10° C. during a time of 5 hours. The volume ratio of hydrogen fluoride to hydrocarbon mixture was 0.16 in the reaction zone. From this reaction mixture was recovered 40 grams of hexyl fluoride and 469 grams of alkylate. The hexyl fluoride boiled at 75–77° C., had a refractive index of 1.3721 at 20° C. and a density, $d_4^{20}$, of 0.780. The alkylate contained 2% by volume of pentane, 5% of hexanes, 45% of octanes, 21% of nonanes, and a higher boiling residue.

Determinations of the carbon and hydrogen content and the molecular weight of hexyl fluoride gave the following results:

|  | Found | Calcd. for $C_6H_{13}F$ |
|---|---|---|
| Mol. Wt. | 101 | 104 |
| Per Cent C | 69.93 | 69.6 |
| Per Cent H | 11.11 | 12.59 |

This alkyl fluoride was shown to be 1-fluoro-3,3-dimethylbutane because upon hydrolysis (by heating with water and magnesium oxide at 225° C. for 4 hours in a sealed, glass tube) it yielded 3.3-dimethylbutanol-1. The structure of the latter was proved by conversion to its 3,5-dinitrobenzoate derivative which melted at 83° C. This derivative was then converted to the alpha-naphthylamine addition compound which melted at 132° C.

The yield of fluorohexane is increased and the amount of by-product (such as alkylate) decreased by carrying out the reaction in the presence of a substantially inert diluent (such as a normal paraffin).

*Example II*

28 grams of ethylene, 75 grams of tertiary butyl alcohol and 200 grams of isobutane are introduced to an autoclave containing 85 grams of hydrogen fluoride of 98% concentration and the resultant mixture is stirred at a temperature of 15° C. for a time of 8 hours.

The resultant reaction mixture is then diluted with ice water and the organic material is separated from the aqueous hydrogen fluoride. From this reaction mixture is obtained 35 grams of hexyl fluoride and 80 grams of a substantially saturated alkylate. The hexyl fluoride boils at a temperature of 75–77° C. at atmospheric pressure, has a refractive index of 1.3725, at 20° C. and a density, $d_4^{20}$, of 0.782. The alkylate contained paraffinic hydrocarbons of substantially the same boiling range as the alkylate referred to in Example I.

Also the hexyl fluoride obtained in this run has substantially the same composition and physical properties as that obtained in Example I and identified as 1-fluoro-3,3-dimethylbutane.

*Example III*

A mixture of 30 grams of ethylene, 100 grams of tertiary amyl alcohol (2-methyl-2-butanol) and 100 grams of substantially anhydrous hydrogen fluoride are agitated in a steel reactor at a temperature of 0° C. during a time of six hours. From this reaction is recovered 32 grams of heptyl fluoride which boils at a temperature of from 109 to 111° C. at a pressure of one atmosphere absolute, has a refractive index, $n_D^{20}$, of 1.3810 at 20° C. and a density, $d_4^{20}$, of 0.791. Hydrolysis of the fluoride to 3,3-dimethyl-1-pentanol proves that the fluoride is 1-fluoro-3,3-dimethylpentanol.

We claim as our invention:

1. A process which comprises reacting ethylene, a tertiary alkanol, and hydrogen fluoride at a temperature of from about −50° C. to about 100° C. to form a 1-fluoro-3,3-dialkylalkane having two carbon atoms more per molecule than the tertiary alkanol charged.

2. A process which comprises reacting ethylene, tertiary butyl alcohol, and hydrogen fluoride at a temperature of from about −50° C. to about 100° C. to form 1-fluoro-3,3-dimethylbutane.

3. A process which comprises reacting ethylene, tertiary butyl alcohol, and hydrogen fluoride at a temperature of from about −10° C. to about 50° C. to form 1-fluoro-3,3-dimethylbutane.

4. A process which comprises reacting ethylene, tertiary amyl alcohol, and hydrogen fluoride at a temperature of from about −50° C. to about 100° C. to form 1-fluoro-3,3-dimethylpentane.

5. A process which comprises reacting ethylene, tertiary amyl alcohol, and hydrogen fluoride at a temperature of from about −10° C. to about 50° C. to form 1-fluoro-3 3-dimethylpentane.

6. A process for producing a 1-fluoro-3,3-dialkylalkane and a hydrocarbon alkylate which comprises reacting a mixture of ethylene, a tertiary alkanol, and an isoparaffin with hydrogen fluoride at a temperature of from about −50° C. to about 100° C.

7. A process for producing 1-fluoro-3,3-dimethylbutane and a hydrocarbon alkylate which comprises reacting a mixture of ethylene, tertiary butyl alcohol, and isobutane with hydrogen fluoride at a temperature of from about −50° C. to about 100° C.

8. A process for producing 1-fluoro-3,3-dimethylbutane and a hydrocarbon alkylate which comprises reacting a mixture of ethylene, tertiary butyl alcohol, and isobutane with hydrogen fluoride at a temperature of from about −10° C. to about 50° C.

9. A process for producing 1-fluoro-3,3-dimethylpentane and a hydrocarbon alkylate which comprises reacting a mixture of ethylene, tertiary amyl alcohol, and isobutane with hydrogen fluoride at a temperature of from about −50° C. to about 100° C.

10. A process for producing 1-fluoro-3,3-dimethylpentane and a hydrocarbon alkylate which comprises reacting a mixture of ethylene, tertiary amyl alcohol, and isobutane with hydrogen fluoride at a temperature of from about −10° C. to about 50° C.

CARL B. LINN.
LOUIS SCHMERLING.

REFERENCES CITED

The following references are of record in the file of this patent:

| Number | Name | Date |
|---|---|---|
| 2,342,677 | Linn | Feb. 29, 1944 |
| 2,419,500 | Peterson et al. | Apr. 22, 1947 |
| 2,451,843 | Linn et al. | Oct. 19, 1948 |

OTHER REFERENCES

Adams et al.: "Organic Reactions," vol. II, pp. 73–4 (1944).